United States Patent
Lougheed et al.

(10) Patent No.: US 9,063,530 B2
(45) Date of Patent: Jun. 23, 2015

(54) IMPLEMENT PERFORMANCE

(71) Applicant: Clark Equipment Company, West Fargo, ND (US)

(72) Inventors: Christopher W. Lougheed, Carver, MN (US); Spencer L. Mindeman, West Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 14/143,886

(22) Filed: Dec. 30, 2013

(65) Prior Publication Data

US 2014/0277962 A1    Sep. 18, 2014

Related U.S. Application Data

(60) Provisional application No. 61/792,941, filed on Mar. 15, 2013.

(51) Int. Cl.
| | |
|---|---|
| *G06F 19/00* | (2011.01) |
| *G05B 19/04* | (2006.01) |
| *A01B 76/00* | (2006.01) |
| *B23Q 15/00* | (2006.01) |
| *B66F 9/20* | (2006.01) |
| *E02F 3/36* | (2006.01) |
| *E02F 3/96* | (2006.01) |

(Continued)

(52) U.S. Cl.
CPC ............... *G05B 19/04* (2013.01); *A01B 76/00* (2013.01); *B23Q 15/00* (2013.01); *B66F 9/20* (2013.01); *E02F 3/3654* (2013.01); *E02F 3/96* (2013.01); *E02F 9/2033* (2013.01); *E02F 9/2221* (2013.01); *E02F 9/265* (2013.01); *G05B 19/00* (2013.01); *E02F 9/2058* (2013.01)

(58) Field of Classification Search
CPC .... E02F 9/2025; F15B 21/042; F15B 21/082; F15B 2211/611; F15B 2211/613
USPC ............... 701/50; 60/327; 180/272, 273, 324, 180/367; 700/83; 37/304
See application file for complete search history.

(56) References Cited

U.S. PATENT DOCUMENTS

| | | | |
|---|---|---|---|
| 5,590,731 | A | 1/1997 | Jacobson |
| 5,692,376 | A | 12/1997 | Miki et al. |

(Continued)

FOREIGN PATENT DOCUMENTS

| | | |
|---|---|---|
| EP | 0810331 | 12/1997 |
| GB | 2464988 | 5/2010 |

OTHER PUBLICATIONS

International Search Report and Written Opinion dated Apr. 24, 2014 for International Application No. PCT/US2013/078311, filed Dec. 30, 2013, 13 pages.

*Primary Examiner* — McDieunel Marc
(74) *Attorney, Agent, or Firm* — John D. Veldhuis-Kroeze; Westman, Champlin & Koehler, P.A.

(57) ABSTRACT

In work implements, power machines and methods of operating implements and power machines using machine and implement controllers, an implement controller receives information from a power machine, with which the work implement is paired, indicative of operational characteristics of the power machine. The implement controller is configured to responsively provide information to the power machine to direct operation of the power machine based upon the received information.

18 Claims, 7 Drawing Sheets

(51) Int. Cl.
  *E02F 9/20* (2006.01)
  *E02F 9/22* (2006.01)
  *E02F 9/26* (2006.01)
  *G05B 19/00* (2006.01)

(56) References Cited

U.S. PATENT DOCUMENTS

| | | | |
|---|---|---|---|
| 6,030,169 A * | 2/2000 | Rossow et al. | 414/680 |
| 6,061,617 A | 5/2000 | Berger et al. | |
| 6,522,964 B1 | 2/2003 | Miki et al. | |
| 6,542,789 B2 | 4/2003 | Ufheil | |
| 6,923,285 B1 * | 8/2005 | Rossow et al. | 180/272 |
| 6,928,353 B2 | 8/2005 | Finley et al. | |
| 7,099,722 B2 | 8/2006 | Casey | |
| 7,614,223 B2 * | 11/2009 | St. Aubin et al. | 60/327 |
| 8,606,441 B2 * | 12/2013 | Ueoka | 701/22 |
| 2003/0051470 A1 | 3/2003 | Maddock | |
| 2005/0080520 A1 * | 4/2005 | Kline et al. | 701/1 |
| 2007/0240471 A1 | 10/2007 | Zusi | |
| 2008/0236153 A1 * | 10/2008 | St. Aubin et al. | 60/327 |
| 2009/0171482 A1 * | 7/2009 | Mindeman et al. | 700/83 |
| 2010/0095559 A1 * | 4/2010 | Buckner | 37/304 |
| 2011/0276222 A1 | 11/2011 | Lougheed et al. | |

* cited by examiner

IMPLEMENT PERFORMANCE

CROSS-REFERENCE TO RELATED APPLICATION

The present application is based on and claims the benefit of U.S. provisional patent application Ser. No. 61/792,941, filed Mar. 15, 2013, the content of which is hereby incorporated by reference in its entirety.

BACKGROUND

This disclosure is directed towards power machines. More particularly, this disclosure is directed toward power machines capable of being operably coupled to implements, the implements that can be coupled to such power machines, and the performance of such coupled power machines and implements. Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Some examples of work vehicle power machines include loaders, excavators, utility vehicles, tractors, and trenchers, to name a few.

Some power machines can be operably coupled to implements that are capable of cooperating with the power machine to perform various tasks. For example, some loaders have lift arms that are capable of having a wide variety of implements operably coupled to them, ranging from a simple bucket or blade to relatively complex implements, such as planers and graders, that have work devices capable of performing various tasks. Many implements are likewise configured to be coupled to a variety of different power machine models or even types, such that a particular implement can be used with multiple different power machines. Examples of a few of these implement types include planers, mowers, stump grinders, backhoes, slab cutters, and snow blowers. There are many other types of such implements as well.

Certain implements require a specific level of supplied power from a power machine to which it is coupled to operate properly. For example, some implements have actuators that may require more (i.e. a higher flow rate) pressurized hydraulic fluid than is provided by a standard loader of a given type. Such implements are sometimes referred to as high flow implements. Certain power machines are capable of selectively supplying an increased flow rate of pressurized hydraulic fluid ("high flow") to such implements. Alternatively, certain implements may not function properly and may even be damaged when exposed to this so-called high flow of pressurized hydraulic fluid. Some implements (such as, for example, a planer) are intended to be operated while the power machine to which they are attached is moving. Often, these types of implements deliver their best performance at a particular travel speed or above or below a particular travel speed. Since implements are frequently designed to work with a variety of different power machine models or types, the potential exists for an implement to be used in a way that delivers less than optimal performance, or that may even damage the implement.

The discussion above is merely provided for general background information and is not intended to be used as an aid in determining the scope of the claimed subject matter.

SUMMARY

Disclosed embodiments include work implements and power machines, as well as combinations of the two, and methods of operating implements and power machines using machine and implement controllers. In a first disclosed embodiment, a work implement is configured to be paired with any of multiple different types of power machines to perform a work function. The work implement includes an implement controller configured to receive information from a power machine with which the work implement is paired indicative of operational characteristics of the power machine. The implement controller is configured to responsively provide information to the power machine to direct operation of the power machine based upon the received information.

In a second disclosed embodiment, a power machine and work implement combination includes a machine controller mounted on the power machine having information related to identification and operational characteristics of the power machine. An implement controller mounted on the implement is configured to communicate with the machine controller to receive the identification and operational characteristic information. The implement controller is configured to responsively send instructions to the machine controller for displaying operational instructions to control the work implement based upon the received information.

In another disclosed embodiment, a method of coordinating operation of a power machine paired with a work implement is provided. The method includes the step of receiving information from the power machine at an implement controller, with the information being indicative of identification of the power machine. The method also includes the step of providing the operational control information from the implement controller to the power machine directing control of an operational characteristic of the power machine based on the identification information.

Various other implement, power machine and method embodiments are also disclosed.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The concepts disclosed herein are not limited in their application to the details of construction and the arrangement of components set forth in the following description or illustrated in the following drawings. That is, the embodiments disclosed herein are illustrative in nature. The concepts illustrated in these embodiments are capable of being practiced or being carried out in various ways. The terminology used herein is for the purpose of description and should not be regarded as limiting. Words such as "including," "comprising," and "having" and variations thereof as used herein are meant to encompass the items listed thereafter, equivalents thereof, as well as additional items.

Figure 1:
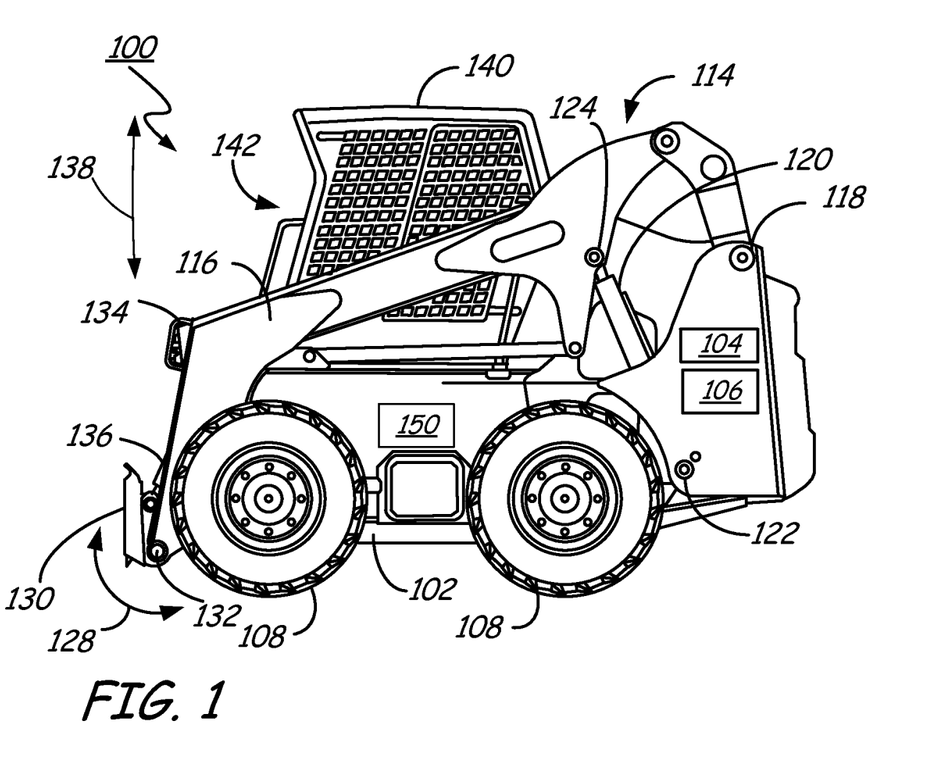
FIG. 1 is a side elevation view of a representative power machine upon which disclosed embodiments can be advantageously practiced.

The embodiments discussed below are directed toward power machines and systems on power machines that are configured to communicate with an operably coupled implement for improving the performance of the implement. In addition, the discussed embodiments include implements capable of communicating with such power machines in a way that provides for improved implement performance. The embodiments are discussed with respect to power machines generally and those of skill in the art will appreciate that the disclosed embodiments can be practiced on any of a number of different types of power machines and are not intended to be limited in application to any one type of power machine. For the purposes of this discussion, a representative power machine on which the embodiments can be practiced is illustrated in FIG. 1 and described below before any embodiments are disclosed. For the sake of brevity, only one representative power machine is discussed. However, as mentioned above, the embodiments below can be practiced on any of a number of power machines, including power machines of different types from the representative power machine discussed below.

Figure 2:
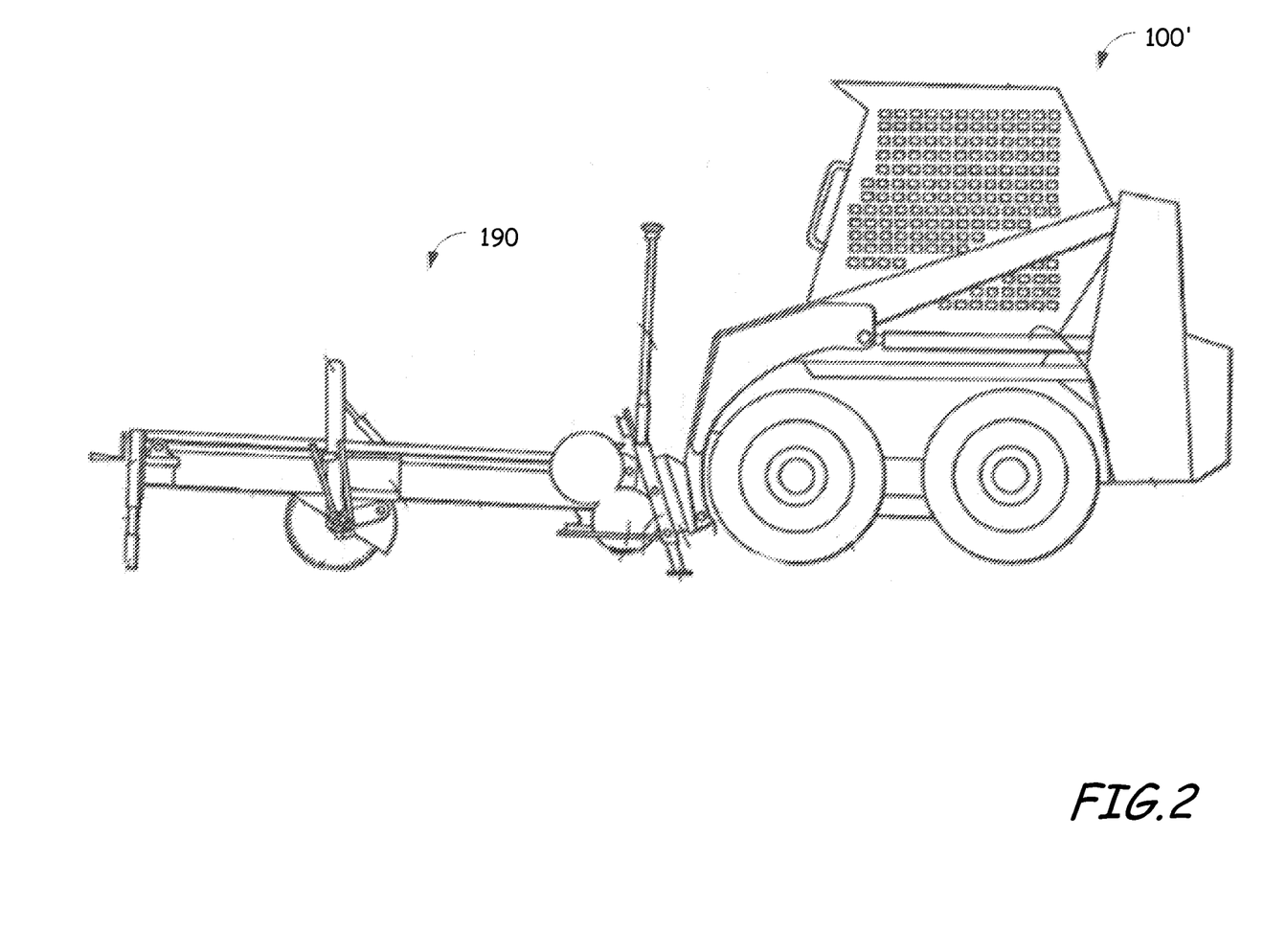
FIG. 2 is a side elevation view of another representative power machine similar to that shown in FIG. 1, paired with a representative implement that includes an implement controller for controlling actuators on the implement.

FIG. 1 is a side elevation view of a representative power machine 100 upon which the disclosed embodiments related to power machines can be employed. FIG. 2 is a side elevation view of another representative power machine 100' that is generally similar to power machine 100 with a representative implement 190 for performing work functions operably coupled to power machine 100'. The power machines 100 and 100' illustrated in FIGS. 1 and 2 are skid steer loaders, but other types of power machines, including work vehicles such as tracked loaders, steerable axle loaders, including all-wheel steer loaders, excavators, telehandlers, walk behind loaders, trenchers, and utility vehicles, to name but a few examples, may employ the disclosed embodiments related to power machines. Implement 190 illustrated in FIG. 2 is a slab cutter, but other types of implements, including planers, mowers, stump grinders, backhoes, snow blowers, trenchers, and log splitters can be advantageously coupled with a power machine that includes the components and features of the disclosed embodiments. Implement 190 is representative of any type of implement that includes an implement controller (not shown in FIG. 2) configured as described below in disclosed exemplary embodiments to direct operation of the power machine based on identification and/or operational characteristics information provided by the power machine to the implement controller. The term "operational characteristic" as used in this disclosure refers to operational capabilities of the power machine that define the ability of the power machine to provide power to, or otherwise function with, the implement to carry out work functions. For example, operational characteristics can include information such as maximum hydraulic flow rates or pressures, maximum RPMs of the power machine engine, maximum horsepower, minimum or maximum speed capabilities of the power machine, software version capabilities of the power machine, types of user inputs in the power machine, etc. Operational characteristics are different from implement control information (i.e., information related to actual control of functions on the implement).

The following description of representative power machine 100 describes particular components and systems thereon. This description includes components specific to power machine 100 as well as components and systems generally available on a variety of power machines, including power machine 100'. Power machine 100 includes a supporting frame or main frame 102 that supports a power source 104, which in some embodiments is an internal combustion engine. A power conversion system 106 is operably coupled to the power source 104. Power conversion system 106 illustratively receives power from the power source 104 and operator inputs to convert the received power into power signals in a form that is provided to and utilized by functional components of the power machine.

Power conversion system 106 includes hydraulic components such as one or more hydraulic pumps and various actuators and valve components that are illustratively employed to receive and selectively provide power signals in the form of pressurized hydraulic fluid to some or all of the actuators used to control functional components of the power machine 100. Various power machines of the type that can employ the embodiments disclosed herein can have various different configurations of power conversion systems that provide power signals to work devices. For example, the power conversion system 106 can include electric generators or the like to generate electrical control signals to power electric actuators. In other power conversion systems, mechanical components such as gear reduced drive shafts can also be employed. The concepts discussed herein are not limited to any one power conversion system.

Referring now back to FIG. 1, among the functional components that are capable of receiving power signals from the power conversion system 106 are tractive elements 108, illustratively shown as wheels, which are configured to rotatably engage a support surface to cause the power machine to travel. Other examples of power machines can have tracks or other tractive elements instead of wheels. In an example embodiment, a pair of hydraulic motors (not shown in FIG. 1), are provided to convert a hydraulic power signal into a rotational output. In power machines such as skid steer loaders, a single hydraulic motor can be operatively coupled to both of the wheels on one side of the power machine. Alternatively, a hydraulic motor can be provided for each tractive element in a machine. In a skid steer loader, steering is accomplished by providing unequal rotational outputs to the tractive element or elements on one side of the machine as opposed to the other side. In some power machines, steering is accomplished through other means, such as, for example, steerable axles.

The power machine 100 also includes a lift arm structure 114 that is capable of being selectively raised and lowered with respect to the frame 102. The lift arm structure 114 illustratively includes a lift arm 116 that is pivotally coupled to the frame 102 at joint 118. An actuator 120 configured to receive power from power conversion system 106 is pivotally coupled to both the frame 102 and the lift arm 116 at joints 122 and 124, respectively. The actuator 120 in FIG. 1 is a hydraulic cylinder often referred to as a lift cylinder and is a representative example of one type of actuator that can power a work element on a representative power machine, in this case, a lift arm. Extension and retraction of the actuator 120 causes the lift arm structure 114 to pivot about joint 118 and thereby be raised and lowered along a generally vertical path indicated approximately by arrow 138. The lift arm 116 is representative of the type of lift arm that may be coupled to the power machine 100. The lift arm structure 114 shown in FIG. 1 includes a second lift arm and actuator disposed on an opposite side of the power machine 100, although neither is shown in FIG. 1. Other lift arm structures, with different geometries, components, and arrangements can be coupled to the power machine 100 or other power machines upon which the embodiments discussed herein can be practiced without departing from the scope of the present discussion.

An implement attachment apparatus in the form of an implement carrier 130 is pivotally attached to the lift arm 116 at joint 132. One or more actuators 136 are pivotally coupled to the implement carrier and the lift arm structure 114 to cause the implement carrier 130 to rotate under power about an axis that extends through the joint 132 in an arc approximated by arrow 128 in response to operator input. The actuators 136 shown in FIG. 1 are hydraulic cylinders, referred to as tilt actuators or tilt cylinders, which are capable of being actuated by receiving pressurized hydraulic fluid from the power conversion system 106. The tilt actuators 136 are another example of actuators that can power a work element on a representative power machine. The implement carrier 130 is configured to accept and secure any one of a number of different implements (e.g., implement 190 shown in FIG. 2) to the power machine 100 as may be desired to accomplish a particular work task. Implements, such as implement 190 of FIG. 2, can likewise be configured to be coupled to or paired with various types and/or models of power machines, one at a time, with the various different types and/or models of power machines each having operational characteristics, often unique to the particular type or model of power machine. The operational characteristics can also be unique to a particular power machine at a particular point in time under particular operational conditions.

In some applications, a simple implement (that is an implement having no actuation devices thereon for performing a work function) such as a bucket can be coupled to the implement carrier 130 to accomplish a variety of tasks. However, many other implements that are couplable to implement carrier 130 have actuation devices such as cylinders and motors, to name two examples for accomplishing a variety of work functions. In addition, many of these implements are referred to as intelligent implements. Intelligent implements have control devices, often in the form of electronic controllers capable of controlling actuation of the one or more actuators on the implement. Many of these implements receive power and/or control signals from an external source, such as a power machine to which they are coupled to operate the various actuators on the implement. The power machine 100 provides such an external source, accessible at a port 134, of power and control signals that can be coupled to an implement to control various actuators on such an implement, in response to operator inputs. In one embodiment, port 134 includes hydraulic couplers (not shown) that are connectable to an implement for providing power signals in the form of pressurized fluid provided by the power conversion system 106 for use by an implement that is operably coupled to the power machine 100. In addition, port 134 includes electrical connectors (not shown) that can provide power signals and control signals to an implement to control and enable actuators of the type described above to control operation of functional components on an implement.

Power machine 100 also illustratively includes a cab 140 that is supported by the frame 102 and defines, at least in part, an operator compartment 142. Operator compartment 142 typically includes an operator seat (not shown in FIG. 1) and operator input devices and display devices (neither shown in FIG. 1) accessible and viewable from an operating position such as sitting in the seat. When an operator is positioned in an operating position, the operator can manipulate operator input devices to control such functions as driving the power machine 100, raising and lowering the lift arm structure 114, rotating the implement carrier 130 about the lift arm structure 114 and make power and control signals available to a coupled implement via the sources available at port 134.

Electronic machine controller 150 is configured to receive input signals from operator input devices, and provide control signals to the power conversion system 106, among other tasks. Electronic controller 150 can be implemented in a single controller package on power machine 100 with memory and a processor capable of accessing the memory to retrieve executable instructions and store data. Electronic controller 150 also includes a communication feature, capable of communicating with various devices, including a control device on an intelligent implement with which power machine 150 is operably coupled. In some embodiments, electronic controller 150 can be implemented in a plurality of controller packages, each of which is capable of performing some of the functions of the electronic controller 150. The embodiments discussed herein are not limited to any single physical arrangement of electronic controller 150. The communication feature can include the capability to communicate on a wired serial communication bus, wirelessly, or via any other suitable communication method. The electronic controller 150 is further configured to send and receive information via the communication feature to and from a control device on an intelligent implement for the purposes of controlling work tasks to be performed by the intelligent implement. Details of some of the communication between the electronic controller 150 and a controller on an intelligent implement will be detailed as part of embodiments discussed below.

Figure 3:
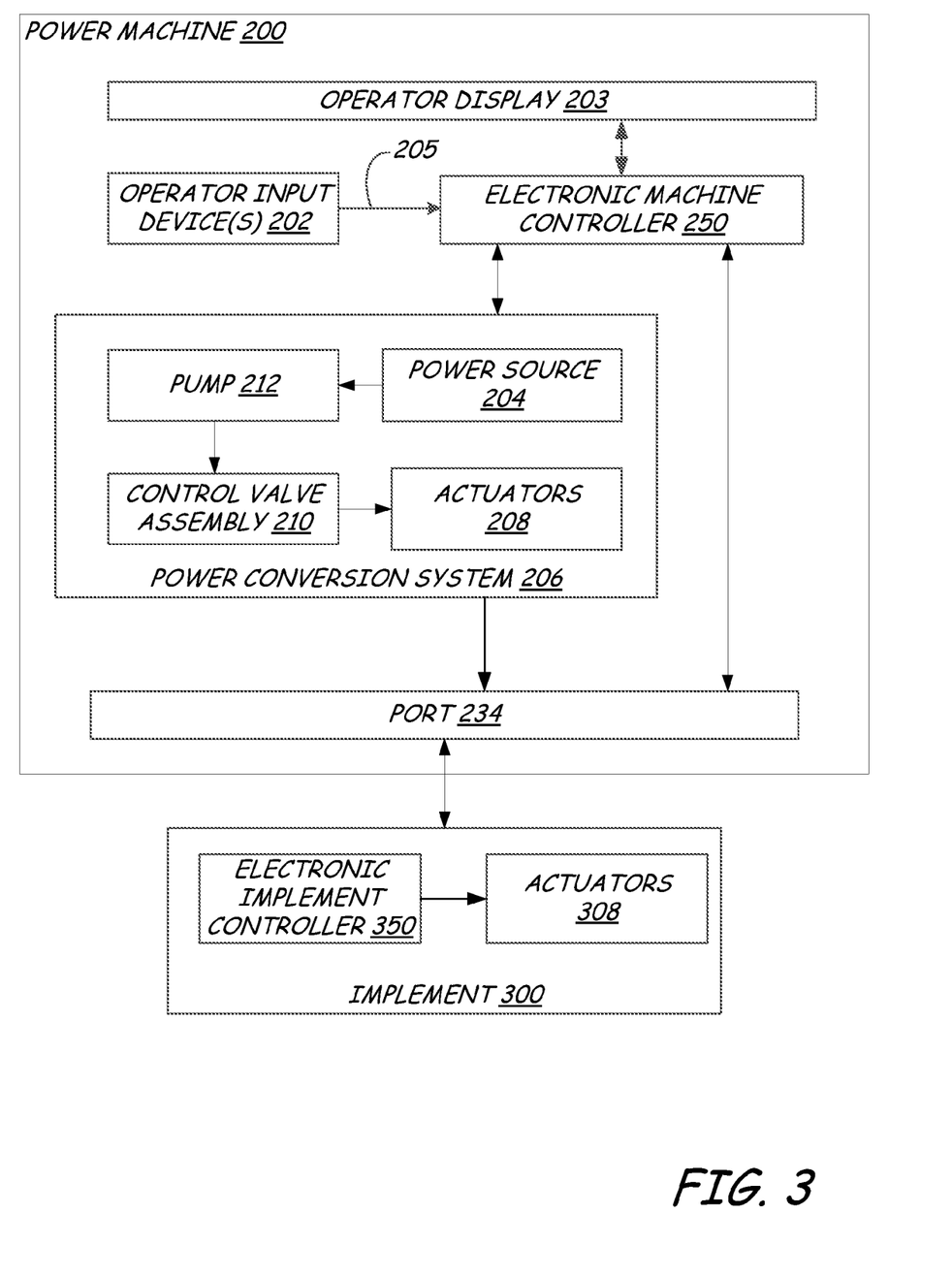
FIG. 3 is a block diagram illustrating components of a power machine and an implement according to one exemplary embodiment.

FIG. 3 provides a block diagram of a power machine 200 with an intelligent implement 300 operably coupled to the power machine, with each of the power machine 200 and the intelligent implement 300 having features in accordance with exemplary embodiments. Power machine 200 can be any of a number of different types of power machines, including, but not limited to, the representative power machines 100 and 100' described above. Likewise, implement 300 can be any of a number of different intelligent implements. One or more operator input devices 202 are in communication with electronic machine controller 250. The operator input devices 202 are manipulable by an operator to provide control signals 205 to the electronic machine controller 250 indicative of intentions of the operator. Operator input devices 202 can take the form of joystick controllers, levers, foot pedals, switches, actuable devices on a hand grip, pressure sensitive electronic display panels, remote devices capable of communicating with electronic machine controller 250 via wired or wireless communication, and the like. The operator input devices 202 are manipulated to provide control signals for controlling some or all of the functions on the power machine 200 including controlling various actuators such as travel actuators, and work function actuators such as the lift and tilt actuators discussed above with reference to power machine 100 of FIG. 1. In addition, electronic machine controller 250 is configured to communicate with an electronic implement controller such as electronic implement controller 350 on intelligent implement 300. In the embodiment shown in FIG. 3, the communication is achieved through a connection made at port 234. In other embodiments, the communication is achieved through a wireless connection or other wired connection.

Power conversion system 206 as shown in FIG. 3 includes a power source 204 that provides a power input to a pump 212 that can, in turn, directly control one or more actuators 208 either directly or, as shown in FIG. 3, through a control valve assembly 210. While pump 212 is shown in block diagrammatic form as a single pump, in various embodiments, any number and types of pumps can be employed to provide pressurized hydraulic fluid to various components in the power conversion system 206. Electronic machine controller 250 is in communication with the power conversion system 206 for controlling components in the control valve assembly 210, the pump 212, or both. Actuators 208 include devices such as lift and tilt cylinders, drive motors, and the like. In addition, the power conversion system 206 is capable of providing pressurized hydraulic fluid for use by an implement via port 234.

Implement 300 is an example of an intelligent implement shown as being operably coupled to the power machine 200 via port 234 and capable of communication with electronic machine controller 250 on power machine 200. Implement 300 has an implement controller 350 that controls the actuation of one or more actuators 308 on the implement. When implement 300 is operably coupled to the power machine 200 via port 234, power and control signals are provided from the power machine to the implement. In some embodiments, communication between the implement controller 350 and the electronic machine controller 250 results in power machine 200 providing pressurized hydraulic fluid to the implement 300 via port 234. The implement controller 350 will then control the flow of the received pressurized hydraulic fluid to the one or more actuators 308 such as, for example, controlling valve components (not shown in FIG. 3) that when actuated provide flow paths to actuators as desired. In addition, for embodiments of implements that have electrically controlled actuators, the implement controller 350 selectively provides an electrical power signal to actuators. In some embodiments, signals from operator input devices 202 are provided to the electronic implement controller 350, either directly from the operator input devices via a communication bus or through electronic machine controller 250. The implement controller 350 then requests pressurized hydraulic fluid from the machine 200 via the electronic machine controller 250. The electronic implement controller 350 is also capable of providing control signals for actuation devices on or associated with the implement 300 as discussed above.

Figure 4:
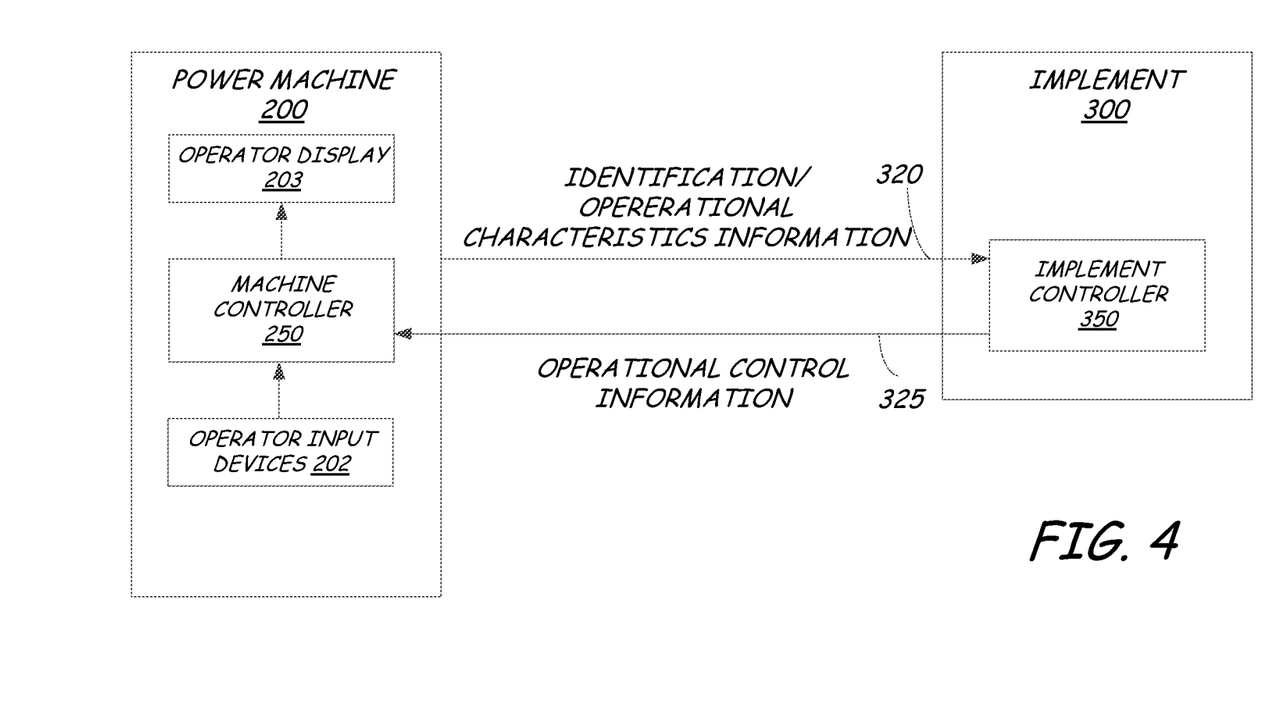
FIG. 4 is a block diagram illustrating an implement, a power machine, and a combination thereof configured in accordance with various exemplary embodiments.

While some embodiments are directed to a combination of an implement and a power machine, other embodiments are directed to implements that are configured to be coupled to power machines with interactions between such implements and the power machines. FIG. 4 is a block diagram illustrating the pairing of implement 300 with power machine 200. For the purposes of this discussion, the pairing of power machine 200 with implement 300 includes communication of power and/or control signals between the power machine and implement. In some embodiments, an implement that paired with a power machine is not actually attached to an implement carrier such as implement carrier 130 shown in FIG. 1. Pairing refers generally to the establishment of communication between electronic implement controller 350 and electronic machine controller 250 of the power machine to provide operational control information.

As discussed above, certain implements require a specific level of operation from a loader to operate properly, including providing a sufficient, but not excessive rate of hydraulic flow to the implement and/or traveling at a proper rate of speed. It is advantageous, then, that the electronic machine controller 250 has information about the implement 300 with which it is paired. Specifically, it is advantageous to provide information about optimum operational levels from the power machine 200 to implement 300. Likewise, it can be advantageous for the electronic implement controller 350 to have information about the power machine to which it is operably coupled. In disclosed embodiments, power machine operational characteristic information 320 is provided to the electronic implement controller 350, about the power machine to which it is coupled or paired. This information can include information about the particular type of power machine that is provided (i.e., a model), and various characteristics about the particular machine such as whether it has high flow capability, electronic control of drive systems and throttle systems, or whether it has a particular version of onboard software to perform tasks that other, less up-to-date versions of that particular model may not have. Other power machine operational characteristic information 320 that can be provided to an electronic implement controller 350 includes contemporaneous or dynamic operational status information such as whether the machine is turning and if so, in what direction, hydraulic oil temperature, engine RPM, and travel speed, to name a few.

Electronic implement controller 350 is configured such that, in response to this information, the electronic implement controller 350 makes operational decisions. In some cases, when the implement controller 350 determines that the machine to which the implement is coupled is incapable of properly operating the implement or is incapable of properly operating the implement at its full capacity, the electronic implement controller 350 either prohibits the implement from being operated on that particular carrier or operates on that carrier at a reduced functionality. In other cases, the electronic implement controller 350 instructs the electronic machine controller 250, via operational control information 325, to operate the machine 200 in a particular way, such as by directing a maximum or minimum hydraulic oil flow or pressure, limiting travel speed, setting engine RPM to given maximum or minimum level, and so forth. For example, the implement controller on a planer implement can request a specific maximum engine speed, thereby reducing the top speed available. The planer implement controller can also request an optimal engine torque for operating the planer. In another example, the implement controller on a laser grader implement, can establish an optimum ground speed for achieving the best grade control and can then limit the machine to a maximum of that speed. In the various embodiments, after electronic implement controller 350 provides operational control information 325 to the electronic machine controller 250, the electronic machine controller controls the power machine 200 and/or the implement 300, in response to input signals 205 from operator input devices and as constrained or controlled by the operational control information to achieve improved or optimal performance of the implement.

Figure 5:
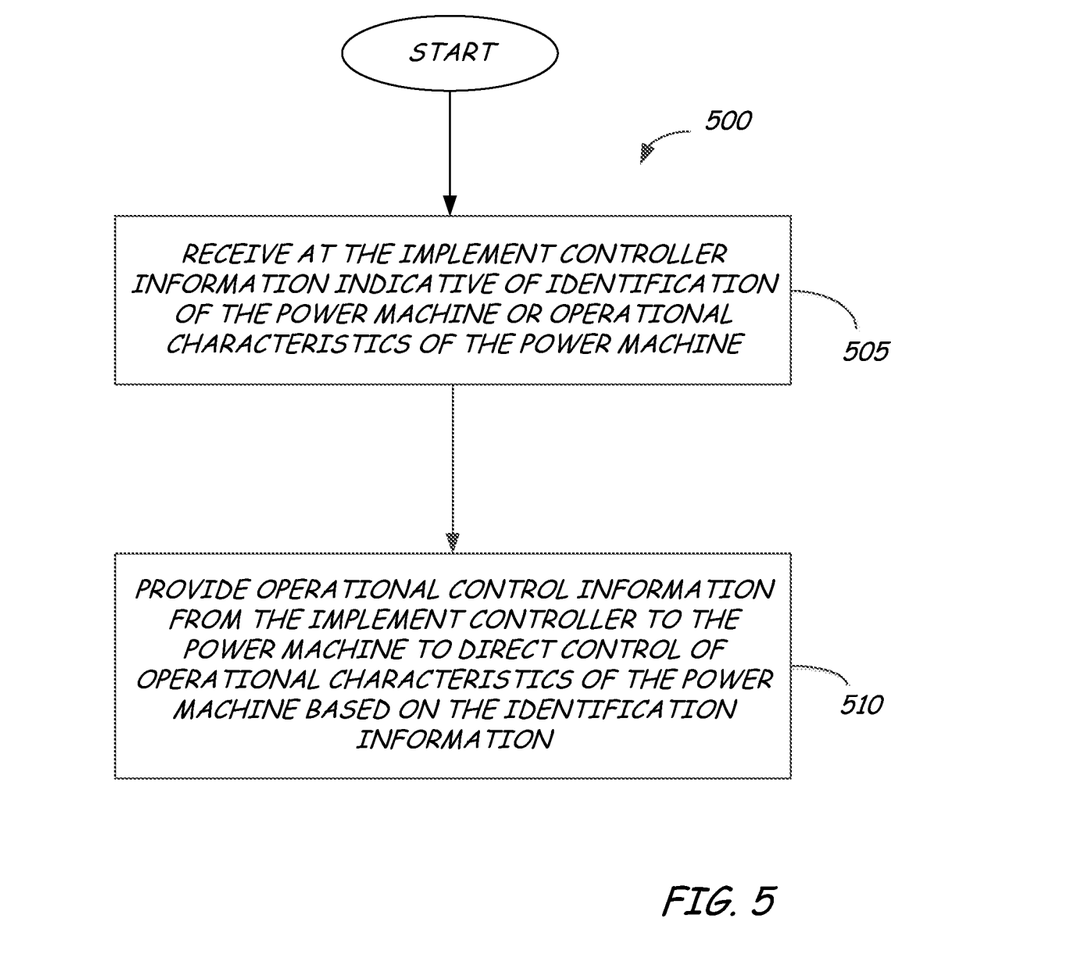
FIGS. 5-7 are block diagrams illustrating exemplary method embodiments.

The above descriptions of various embodiments include exemplary methods of operation of an implement controller, a machine controller, or both. FIG. 5 is a flow diagram illustrating a first method 500 of coordinating operation of a power machine 200 paired with an implement 300 as is shown schematically in FIG. 4. At block 505, the method includes receiving information from the power machine 200 at electronic implement controller 350. In exemplary embodiments, the received information is indicative of identification of the power machine and/or operational characteristics of the power machine. In various exemplary embodiments, any of the above-discussed examples of identification or operational characteristic information can be used. However, the disclosed method is not limited to these particular types of identification or operational characteristics information.

As shown at block 510, the method next includes providing the operational control information from the electronic implement controller 350 to the power machine 200 to direct control of an operational characteristic of the power machine based on the identification information and/or operational characteristics. The method can further include configuring and using the electronic machine controller 250 on the power machine to control operation of the power machine as a function of the operational control information from the implement controller, which is described in greater detail below with reference to FIG. 7. In various embodiments, the methods can include receiving control signals at the machine controller from one or more user input devices 202 on the power machine. Using the electronic machine controller 250 on the power machine to control operation of the power machine further includes using the machine controller to control operation of the power machine as a function of both the operational control information from the implement controller and the control signals from the user input device. In various embodiments, controlling operation of the power machine also includes using the electronic machine controller 250, responsively to the operational control information from the implement controller 350, to display operational instructions on operator display 203 for use by a user to control the implement.

Figure 6:
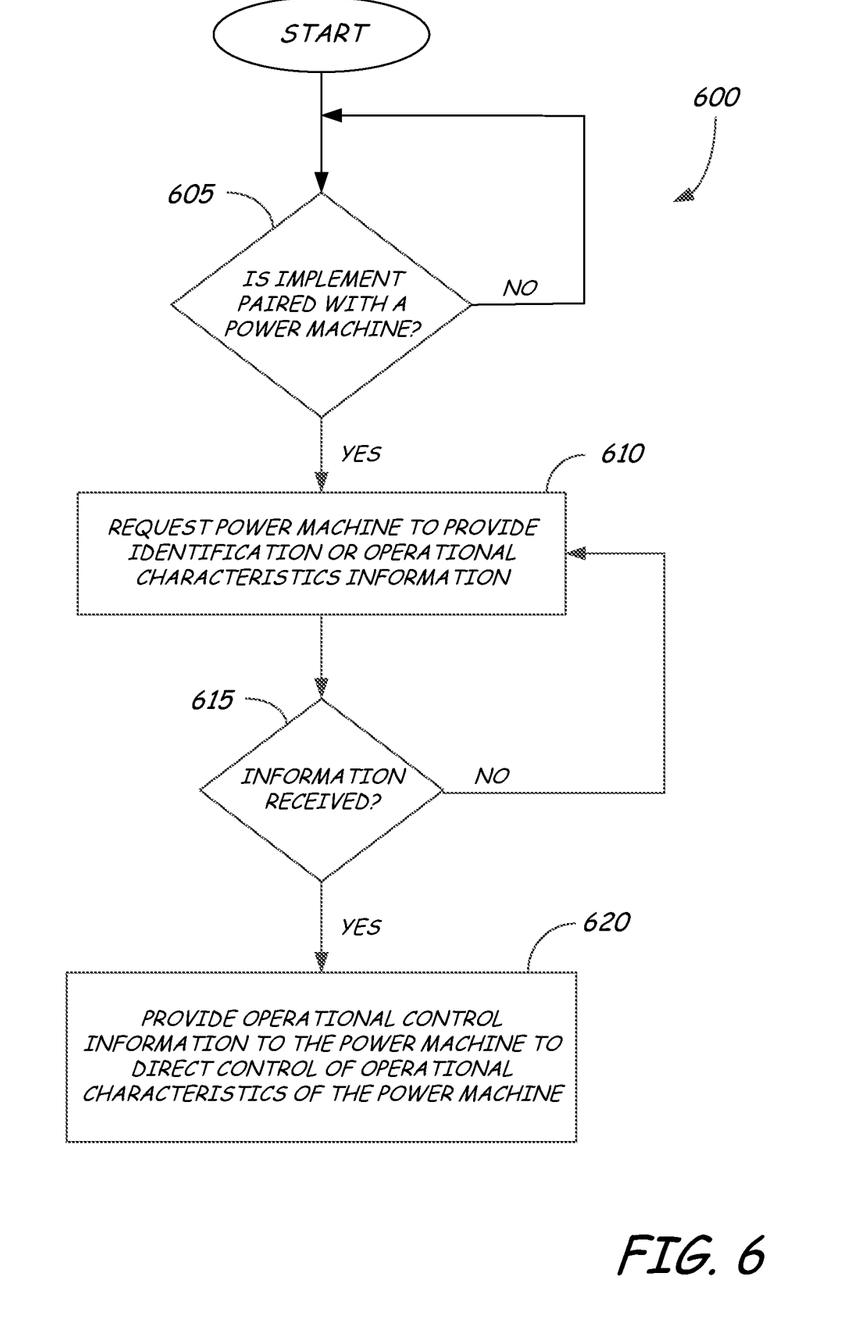

FIG. 6 is a flow diagram illustrating a method 600 specifically from the perspective of the implement 300 in example embodiments and the interface between the implement and power machine 200. As shown at block 605, the method 600 first establishes communication between the implement 300 and the power machine 200.

Once implement 300 is in communication with power machine 200, the electronic implement controller 350 requests, at block 610, that the power machine 200 provide identification or operational characteristics information so that electronic implement controller 350 can determine how, if at all, power machine 200 will be allowed to operate implement 300. At block 615, the method determines whether the power machine 200 has provided the implement 300 the requested information. Once the implement 300 (via the electronic implement controller 350) determines that the power machine 200 has provided the requested information, the method moves to block 620 where the electronic implement controller 350 provides operational control information to the power machine 200 to direct control of operational characteristics of the power machine. Providing operational control information to the power machine to direct control can take many different forms as discussed above, including causing operational instructions to be displayed on display device 303, controlling ground speed of the power machine, controlling engine RPMs of the power machine, limiting functionality of the implement available to the power machine, and so forth.

Figure 7:
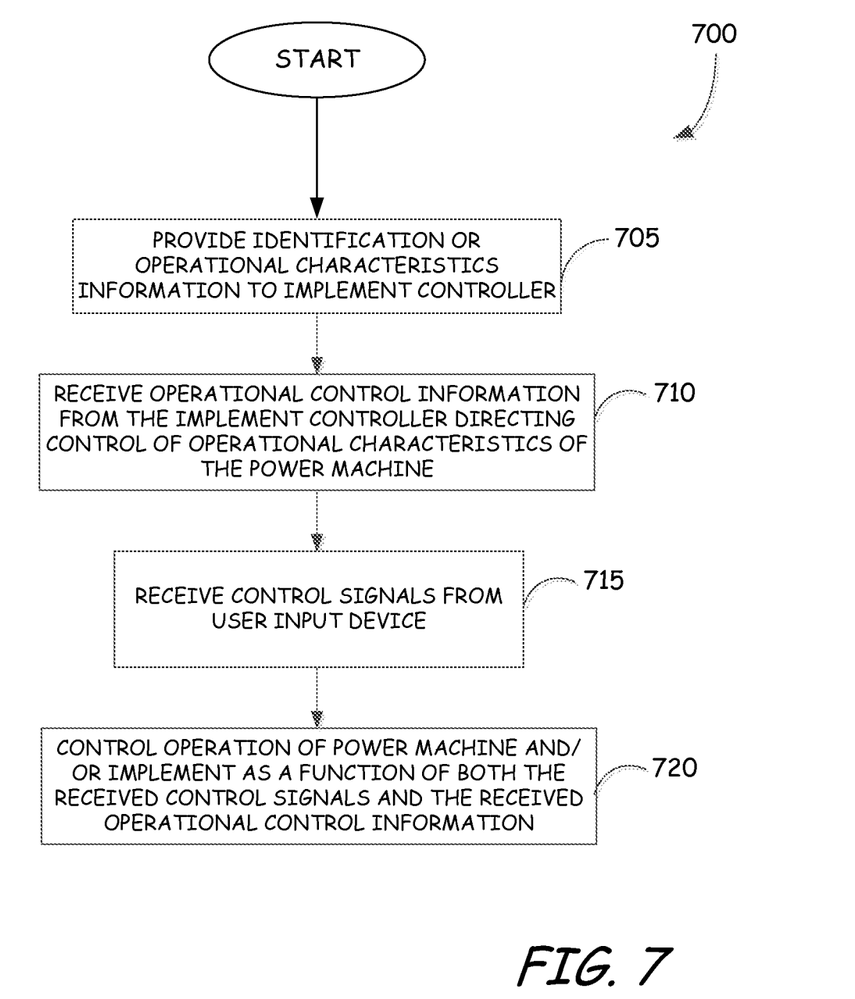

FIG. 7 illustrates a method 700 from the perspective of machine 200 in example embodiments. At block 705, the method 700 includes having electronic machine controller 250 providing identification and/or operational characteristics information to the implement 300. Once the electronic machine controller 250 provides this information the machine controller receives the operational control information from the electronic implement controller 350, with the operational control information directing control of operational characteristics of the power machine, as shown at block 710. The electronic implement controller 350 then uses the operational control information advantageously to control the functionality or performance of the implement based on the operational characteristics of the particular power machine to which it is attached.

At block 715, operator manipulation of the one or more user input devices 202 on the power machine 200 causes the user input devices to provide control signals 205 to at least the electronic machine controller 250. This information is illustratively provided to the electronic implement controller 350 via the machine controller or alternatively directly from the user input devices 202, which in some embodiments are capable of communicating with the electronic implement controller 350. Finally, at block 720, operation of the power machine and/or implement is controlled as a function of both the received control signals and the received operational control information.

The embodiments above provide important advantages. The nature of implements and power machines is such that implements that can be attached to various different power machines are valuable because of the flexibility that this provides. An operator with different types power machines can employ the same implement on multiple different power machines. Further, having implements and power machines that can identify each other or at least communicate optimum operational characteristics can improve implement function, leading to more efficient work. Further, identifying potential situations that could result in damage to an implement protects such implements from misuse.

Although the present invention has been described with reference to preferred embodiments, workers skilled in the art will recognize that changes may be made in form and detail without departing from the spirit and scope of the invention.

What is claimed is:

1. A work implement configured to be paired with any of a plurality of different types of power machines to perform a work function, the work implement comprising:
   an implement controller configured to receive information from a power machine with which the work implement is paired indicative of operational characteristics of the power machine, wherein the implement controller is configured to responsively make operational decisions, based on the received information, regarding operation of the work implement with the power machine and to provide information to the power machine based on the operational decisions to direct operation of the power machine.

2. The work implement of claim 1, wherein the implement controller is configured to make the operational decisions and provide the information to the power machine based on the operational decisions to direct operation of the power machine based upon the received information with the operational characteristics including the type of power machine with which the implement is paired.

3. The work implement of claim 1, wherein the implement controller is configured to make the operational decisions and provide the information to the power machine based on the operational decisions to direct operation of the power machine based upon the received information with the operational characteristics being indicative of hydraulic fluid flow capability of a power conversion system of the power machine.

4. The work implement of claim 1, wherein the implement controller is configured to make the operational decisions and provide the information to the power machine based on the operational decisions to direct operation of the power machine based upon the received information with the operational characteristics being indicative of whether the power machine has electronic control of drive or throttle systems.

5. The work implement of claim 1, wherein the implement controller is configured to make the operational decisions and provide the information to the power machine based on the operational decisions to direct operation of the power machine based upon the received information with the operational characteristics being indicative of dynamic operational characteristics of the power machine.

6. The work implement of claim 5, wherein the implement controller is configured to make the operational decisions and provide the information to the power machine based on the operational decisions to direct operation of the power machine based upon the dynamic operational status information for the power machine including at least one of hydraulic oil temperature, engine RPM, power machine travel speed, and power machine turning status.

7. The work implement of claim 1, wherein the implement controller is configured to make the operational decisions and provide the information to the power machine based on the operational decisions to direct operation of the power machine based upon the received information with the operational characteristics being indicative of a software version of software installed on the power machine.

8. A power machine in combination with a work implement, comprising:
a machine controller configured to provide information related to identification and operational characteristics of the power machine; and
an implement controller configured to communicate with the machine controller to receive the identification and operational characteristic information, wherein the implement controller is configured to responsively make operational decisions, based on the received identification and operational characteristic information, regarding operation of the work implement with the power machine and to send instructions to the machine controller based on the operational decisions for displaying operational instructions to control the work implement.

9. The power machine of claim 8, and further comprising at least one operator input device operably coupled to the machine controller and configured to provide control signals to the machine controller to communicate control intentions of an operator of the power machine, wherein the implement controller is further configured to send the instructions to direct operation of the power machine, and wherein the machine controller is configured to control operation of the power machine in response to both the control signals from the at least one operator input device and the instructions from the implement controller.

10. The power machine of claim 9, wherein in response to the instructions from the implement controller, the machine controller is configured to control operation of the power machine to limit travel speed of the power machine.

11. The power machine of claim 9, wherein in response to the instructions from the implement controller, the machine controller is configured to control operation of the power machine by setting or limiting an engine rotations per minute (RPM) of an engine of the power machine.

12. The power machine of claim 9, wherein in response to the instructions from the implement controller, the machine controller is configured to control operation of the implement to limit operation of the implement to a reduced functionality relative to functional capabilities of the implement.

13. The power machine of claim 9, wherein the machine controller is configured to provide the information related to operational characteristics including at least one of the type of power machine with which the implement is paired, hydraulic oil flow capability of a power conversion system of the power machine, and whether the power machine has electronic control of drive or throttle systems.

14. The power machine of claim 9, wherein the machine controller is configured to provide the information related to operational characteristics including dynamic operational status information for the power machine comprising at least one of hydraulic oil temperature, engine rotations per minute (RPM), power machine travel speed, and power machine turning status.

15. A method of coordinating operation of a power machine paired with a work implement, comprising:
receiving information from the power machine at an implement controller, the information being indicative of identification of the power machine; and
using the implement controller to make operational decisions, based on the received information from the power machine, regarding operation of the work implement with the power machine and providing operational control information, based upon the operational decisions, from the implement controller to the power machine directing control of an operational characteristic of the power machine.

16. The method of claim 15, and further comprising using a machine controller on the power machine to control operation of the power machine as a function of the operational control information from the implement controller.

17. The method of claim 16, and further comprising receiving control signals at the machine controller from a user input device on the power machine, and wherein using the machine controller on the power machine to control operation of the power machine further comprises using the machine controller to control operation of the power machine as a function of both the operational control information from the implement controller and the control signals from the user input device.

18. The method of claim 15, further comprising using a machine controller, responsively to the operational control information from the implement controller, to display on a display device of the power machine operational instructions to control the work implement.

* * * * *